United States Patent

[11] 3,632,209

[72] Inventor Edward F. Kingman
 San Clemente, Calif.
[21] Appl. No. 32,549
[22] Filed Apr. 28, 1970
[45] Patented Jan. 4, 1972
[73] Assignee The Susquehanna Corporation
 Fairfax County, Va.

[54] SYSTEM FOR MEASURING LIGHT TRANSMITTANCE THROUGH ABSORPTIVE OR DIFFUSIVE MEDIA
 11 Claims, 1 Drawing Fig.
[52] U.S. Cl. .................................................. 356/201, 250/218, 356/205, 356/207
[51] Int. Cl. ...................................................... G01n 21/26
[50] Field of Search............................................ 250/218; 356/51, 103, 104, 201, 204–208, 213, 218, 226, 229

[56] References Cited
UNITED STATES PATENTS
2,198,971  4/1940  Neufeld........................ 356/208

Primary Examiner—Ronald L. Wibert
Assistant Examiner—Evans F. L.
Attorney—Martha L. Ross ABSTRACT: A system and process are disclosed for measuring the transmittance or opacity of a smoke plume discharged from a smokestack or diesel engine exhaust. Measurement is accomplished by passing light pulses through the smoke plume and detecting the remaining energy with a photoelectric detector. The effect of scattered light is eliminated. An electrical signal proportional to the unabsorbed light received at the detector is displayed on a calibrated opacity meter.

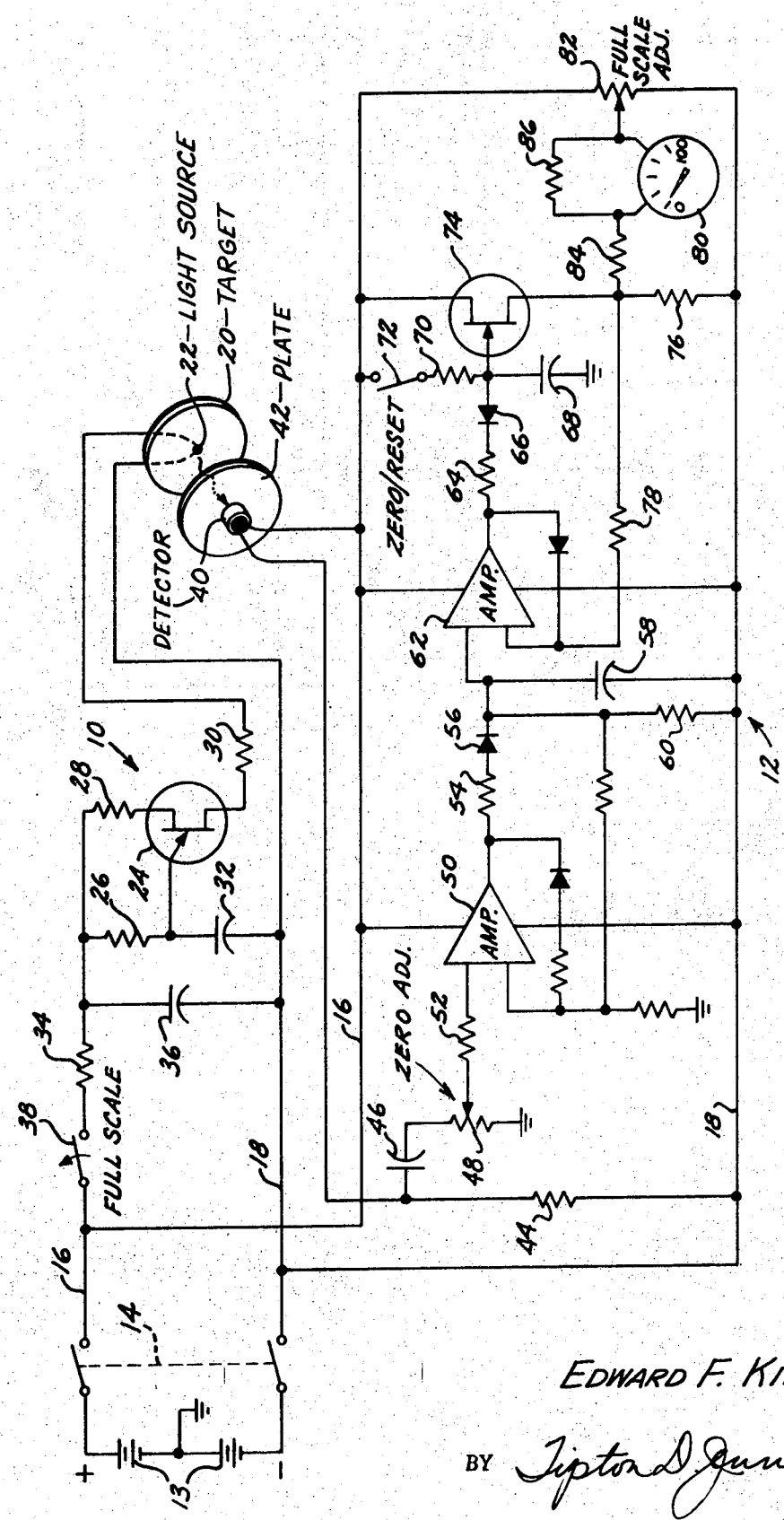

3,632,209

SYSTEM FOR MEASURING LIGHT TRANSMITTANCE THROUGH ABSORPTIVE OR DIFFUSIVE MEDIA

BACKGROUND OF THE INVENTION

The present invention relates broadly to the field of densitometers or transmissometers and more particularly to a system and process for measuring the amount of light energy received through a medium being measured from a source of known or constant intensity. A particular use is in the measurement of the transmittance or opacity of smoke plumes.

Around the turn of the century a procedure for evaluating black smoke was devised by a French engineer, Maximilian Ringelmann, and is still widely used. The luminance of the smoke plume is compared to the luminance of four white charts on which are black grids obscuring 20, 40, 60 and 80 percent of the charts' surfaces.

A comparison is made between (1) the amount of light transmitted to the observer through the black smoke from the portion of sky on its far side and (2) the amount of light from a different and wider area of sky and from the sun, in whatever position it happens to be, reflected to the observer from the white areas of the chart. Even if the smoke does not scatter an appreciable amount of sun and sky light toward the observer, the limitations of such a comparison between totally different quantities has long been recognized. It is readily seen that there is some question as to the accuracy with which an observer can use such things as Ringelmann charts having various shades of blackness to determine the opacity of nonblack plumes. Nevertheless, the Ringelmann charts remain the basis for smoke legislation and control in most, if not all, industrial nations. Other methods of comparison, such as those using filters as well as direct transmission measurement methods have been tried but have been found to be erroneous if the smoke is not black or if it scatters appreciable light to the observer or to the instrument.

As regards a smoke plume which is nonblack or has some color, there appears to be no recognized method of truly evaluating it. In white smoke, for example, the plume is often brighter than light from the sky background because of the scattering of light the plume receives from the rest of the sky and from the sun. A study of the phenomenon of black and nonblack plumes was recently completed by the U.S. Public Health Service in cooperation with the Edison Electric Institute. A report of these studies is presented in "Optical Properties and Visual Effects of Smokestack Plumes," No. 999-AP-30, published in 1967 by the U.S. Department of Health, Education and Welfare. Because of the growing interest in air pollution and because of the inadequacies of prior art techniques and instruments, there is a compelling need for an objective instrumental method and system for measuring plume emissions in the field.

SUMMARY OF THE INVENTION

This patent application discloses a novel system and method for measuring the opacity of a medium even in the presence of scattered light and regardless of the color or lack of color of the medium. Using a smoke plume as an example, the difference in the luminance between a pair of contrasting targets viewed through the plume and viewed clear of the plume is measured. The targets consist of an optically flat black surface and a light source positioned in the center of the black target. The source is flashed at a constant rate, and a detector positioned opposite the target alternately sees the light source and the contrasting black target. A calibrated measuring circuit and meter process the energy received at the detector to provide an indication of the light attenuated or absorbed by the medium being measured. The calibration and construction of the system eliminates the effect of scattered light in the medium and provides a true measurement of transmittance. Thus, as in the particular instance of the opacity measurement of diesel exhaust, it now becomes a simple matter to ascertain whether or not the exhaust smoke falls within or without standards established by state or federal regulations.

BRIEF DESCRIPTION OF THE DRAWING

The foregoing and other objects, features and advantages of the invention will be apparent from the following more particular description of a preferred embodiment of the invention, as illustrated in the sole accompanying drawing showing the light transmitting and receiving circuits forming the system of the present invention.

DESCRIPTION OF THE PREFERRED EMBODIMENT

The instrument shown in the drawing consists of two basic units, one being the transmitter 10, including a light source and contrasting target, and a receiver 12, comprising a detector and a processing and indicating circuit. The system is of rugged construction, lightweight, and readily portable for making field measurements, such as for the measurement of opacity of diesel smoke plumes, which example will be used in the present description. A self-contained battery supply 13 is connected into the circuit by ganged switch 14 in the positive and negative supply lines 16 and 18, respectively. The battery 13 and power switches 16 and 18 can be contained in either the transmitter or receiver section, or separate therefrom, if desired.

The transmitter 10 has a target 20 shown here as being circular in design and large enough to fill the view of the detector of receiver 12. The target 20 is preferably painted with an optically flat-black paint to provide a black or dark target reference. Centered in the target 20 is a light source 22 which functions as a second target. Source 22 is preferably a light-emitting diode having a substantially constant intensity of radiation. This solid state light source 22 is pulsed by a conventional unijunction oscillator 24, and with target 20 provides alternate, contrasting targets. Resistors 26, 28 and 30 and capacitor 32 form the circuit elements of the unijunction oscillator, which is designed to run at a preferred rate of 100 Hz. Resistor 34 and capacitor 36 act as a filter for the power supply. Switch 38, normally closed, is opened when it is desired to make a full-scale calibration of the system.

In the receiver 12, the detector 40 is mounted in a recessed fashion in plate 42. This detector is aimed at the light-emitting diode 22 so that this diode and the target 20 fill its view. Detector 40 is preferably a photosensitive diode, such as a silicon photodiode, whose current is precisely controlled by the intensity of received light. Detector 40 and the targets 20 and 22 are spaced apart to permit the passage of a smoke plume therebetween.

The cathode of diode 40 is connected to positive supply line 16, and its anode is connected to negative supply through a large-valued resistor 44. The anode of photosensitive diode 40 is also connected to input capacitor 46 through which the signals from diode 40 are applied to the amplifying and indicating circuits. Capacitor 46 filters or blocks out steady-state components, thus permitting only the passage of the impulses received from diode 40. The output of capacitor 46 is connected to input resistor 48 constructed as a potentiometer. This potentiometer controls the input level to the amplifying circuits and provides a means for making a zero calibration of the meter circuit, as later described. The tap of potentiometer 48 is connected to the noninverting input of amplifier 50 through resistor 52.

Amplifier 50 is an operational amplifier and provides a high, stable gain to input signals. The remaining inputs to the amplifier 50 are conventional bias leads and feedback loops for such purposes as fast recovery and gain control. The output of amplifier 50 is connected through resistor 54 and diode 56 to capacitor 58. Connected in parallel with capacitor 58 is a resistor 60 of high resistance, preferably on the order of 1 megohm. Resistor 60 provides a leakage or bleed path for capacitor 58. The voltage level at capacitor 58 is applied to the noninverting input of another operational amplifier 62 which is designed to provide essentially unity gain and a high input impedance to this input voltage.

The output of amplifier 62 is applied through resistor 64 and diode 66 to capacitor 68. Connected at the junction of diode 66 and capacitor 68 is a resistor 70 and a normally opened switch 72 used for zero calibration and to reset the circuit, as later described.

The voltage level at capacitor 68 is applied to the gate input of a field-effect transistor 74. This transistor has a resistor 76 connected between its source electrode and negative battery. Transistor 74 is connected as a source follower, and the voltage on capacitor 68 appears at its source and, accordingly, across resistor 76. A feedback path including resistor 78 is applied from this source resistor 76 to the inverting input of operational amplifier 62 to provide a high impedance at the inverting input and thereby cause the high input impedance at the noninverting input.

Meter 80 is connected in a bridge circuit including transistor 74 and resistor 76 on one side of the bridge and potentiometer 82 on the other side of the bridge. Resistors 84 and 86 are conventional current-limiting and shunt resistors, respectively.

The operation of the system can be best understood from a preliminary discussion of the practical measurement of opacity. The basis for an opacity meter can be established even in the presence of scattered light by measuring and comparing the luminance difference between a pair of contrasting targets viewed clear of the plume and through the plume. The value of opacity is one minus the value of transmittance, the latter being a property of transmitted light that can be used to differentiate and characterize plumes. With regard to the luminance of targets, transmittance is defined as:

$$T = (B_1' - B_2')/(B_1 - B_2) \quad (1)$$

where $B_1$ is the luminance of a source, $B_2$ is the luminance of its background, both $B_1$ and $B_2$ viewed clear of the plume; $B_1'$ is the apparent luminance of a source, $B_2'$ is the apparent luminance of its background, both viewed through a plume. In this transmittance formula, both $B_1'$ and $B_2'$ have the same added increment of light caused by scattering, and the scattered light cancels out.

The present system is designed to be calibrated to make the contrast or difference in the luminance clear of the plume, i.e., $B_1-B_2$, equal to 100. The contrast between the apparent luminances, as viewed through the smoke plume, is then:

$$(B_1' - B_2')/100 \quad (2)$$

Now, if both terms of apparent luminance can be referenced to zero by subtracting term $B_2'$, it drops out of the equation leaving only a corrected value of transmittance of $$B_1'/100 \quad (3)$$

for the medium being measured.

In the actual design of the system, the meter face has been designed to read opacity directly, form 0 to 100 percent, instead of transmittance. If desired, the latter can be also read off of the meter or the meter face provided with another scale because 0 and opacity equals 100 percent transmittance and 100 percent opacity equals 0 transmittance. Capacitor 46, previously discussed, blocks all steady-state input signals and thus references the contrast between apparent luminances to 0. The effect of scattering is eliminated.

Prior to the use of the system in measuring the opacity of a smoke plume, it is calibrated to make the contrast clear of the plume equal to 100. One hundred percent opacity is calibrated first. Gang switch 14 is closed, applying power to the system. Switch 38 is opened, turning off oscillator 24 to prevent the transmission of light pulses from diode 22. With no light pulses arriving at diode 40 in the receiver, at best only a steady-state signal will appear at the input to capacitor 46. However, this capacitor blocks this signal; and a 0 voltage appears at potentiometer 48 and, therefore, at the input to amplifier 50. Capacitor 58 is discharged as is capacitor 68 at the output of amplifier 62. With no voltage applied to resistor 76 from the detecting and amplifying circuitry, potentiometer 82 is adjusted to give a full scale reading of 100 percent opacity.

For 0 calibration, switch 38 is closed. Oscillator 24 begins to function and applies energizing pulses to light-emitting diode 22 at the rate of 100 Hz. Switch 72 is also closed and capacitor 68 begins to charge. At the same time the light pulses from diode 22 are detected at diode 40 in the receiver, and amplified current pulses out of amplifier 50 begin to positively charge capacitor 58. The voltage level attained at this capacitor will be proportional to the voltage at the tap of potentiometer 48. Amplifier 62 applies unity gain to the positive voltage at capacitor 58, and this positive voltage is reflected at its output. Diode 66 will, therefore, limit the level to which capacitor 68 can charge, i.e., the level on capacitor 68 cannot exceed the level on capacitor 58, or else diode 66 will conduct to bring the charge on capacitor 68 down to the level of capacitor 58. The voltage on capacitor 68 now appears at resistor 76, and the meter 80 will be at or close to a zero reading. If any adjustment of the meter is needed to give an exact zero reading, the tap of potentiometer 48 can be moved. The effect is to change the voltage on capacitor 58 and, accordingly, at capacitor 68 and resistor 76. It can be seen from the above description that the degree of contrast between the signal and no-signal conditions, or light and dark targets, is not critical because of the system's ability to calibrate for 100 and 0 percent readings.

With the system now calibrated for target contrast clear of any exhaust plume, the target 20 and plate 42 can now be moved by any convenient means so that the exhaust plume from a diesel engine will span or pass through the space between these two members. The system is first reset by closing switch 72, and a full charge is applied to capacitor 68. If the smoke being tested is transparent and free of light attenuating or absorbing particles, then the circuit will function much the same as was described in the 0 calibration mode so that sufficient charge remains on capacitor 68 to cause a 0 percent opacity reading at meter 80. Assume, however, the usual case where the smoke is black, nonblack or colored. The light pulses out of diode 22 will be attenuated or absorbed by the smoke causing a reduction in the intensity of the pulses received by diode 40. Because the current through this latter diode is controlled by the intensity of the received light, the amplitude of these pulses will be less than realized for a zero reading. These pulses are applied through capacitor 46 and across potentiometer 48. Amplifier 50 amplifies these pulses and applies their peak positive level through forward-biased diode 56 into storage capacitor 58. Thus, the voltage stored on capacitor 58 is proportional to the voltage tapped at potentiometer 48.

With the pulses being applied at a 100 Hz. rate, the charge on capacitor 58 accumulates quickly to the full value of these amplitude peaks. This level appears at the output amplifier 62. The cathode of diode 66 will be at a lower potential than its anode causing this diode to become forward-biased. Capacitor 68 now discharges through diode 66 into amplifier 62 until the voltage level at this capacitor balances the output of the amplifier. At such time, diode 66 becomes reverse-biased and cuts off.

The voltage on capacitor 68 appears at resistor 76 in the meter circuit and unbalances the bridge circuit of the meter 80 causing current flow. The needle of meter 80 will now move away from the 0 percent point and come to rest at a reading of opacity indicative of the opacity of the smoke being tested.

The RC circuit combination of capacitor 58 and resistor 60 provides a time constant of about 0.1 second and thereby permits only a very slight discharge of capacitor 58 between each pulse being applied at the 100 Hz. rate. Nevertheless, if opacity should increase while the measurement is being taken, capacitor 58 will discharge quickly down to this new level, thereby causing further discharge of capacitor 68 through diode 66 to give a higher opacity reading at meter 80. If, on the other hand, opacity should decrease during the reading, or if there is any doubt as to whether a completed reading is an accurate one, it is a simple matter to close switch 72 to recharge capacitor 68 fully and thereby return the meter to a 0 percent reading in preparation for a new measurement.

The target 20 in the transmitter is preferably painted or coated with an optically flat black covering to give a good contrast between light source 22 and this target. The degree of contrast is not critical, however. In fast, the targets themselves may become appreciably dirty or worn, or smoke particles may coat the surfaces of diodes 22 and 40 reducing contrast or causing a reduction in light intensity without affecting system operation, so long as the system can be calibrated for 0 and full scale meter deflections. Also, since the measurement of opacity does depend on difference readings, the need for critical or precision components is obviated, except perhaps for diodes 22 and 40, since all readings will be affected in the same manner.

While the invention has been particularly shown and described with reference to a preferred embodiment thereof, it will be understood by those skilled in the art that various changes in form and details may be made therein without departing from the spirit or the scope of the invention.

What is claimed is:

1. A system for measuring the opacity or transmittance of a medium comprising,
    a light transmitter, including,
        a. a light source for emitting light,
        b. a target for providing an optical contrast to said light source,
        c. and means for causing said light to be emitted from said light transmitter as pulses of light;
    a receiver, including,
        a. a photosensitive detector spaced from said light source and target and positioned to have its field of view filled thereby, for providing an output in proportion to the intensity of light received through said medium,
        b. a processing circuit connected to said detector for providing an electrical signal proportional to the detector output, said processing circuit including,
            i. means for substantially eliminating the effect of scattered light caused by said medium and received at said detector,
        c. and means connected to said processing circuit for providing a sensible indication of opacity or transmittance of the medium;
    said light source and said detector defining the sole light path between said transmitter and receiver through said medium for receipt of light by said detector.

2. A system as claimed in claim 1 wherein,
    a. said causing means comprises means for intermittently energizing said light source to cause said light source to emit pulses of light.

3. A system as claimed in claim 2 wherein,
    a. said medium is a smoke plume, and
    b. said providing means is a meter for providing a direct reading in percent opacity of said smoke plume.

4. A method for measuring the opacity or transmittance of a medium by the use of a light source and an optically contrasting target and a detector spaced therefrom, and a measuring circuit connected to the detector, comprising:
    a. calibrating said circuit so that the difference in luminance between said light source and contrasting target when viewed by the detector clear of the medium is a fixed value,
    b. pulsing said light source to provide alternately to the detector a source of light and an optically contrasting target as viewed through the medium,
    c. causing said medium to flow in a path between said light source and contrasting target and said detector,
    d. detecting the apparent luminances between said light source and contrasting target when viewed by said detector through said medium,
    e. electrically processing the detected apparent luminances to provide a difference signal, and
    f. referencing said difference signal to said fixed value to give an indication of the opacity or transmittance of said medium.

5. A method as claimed in claim 4 further comprising the step of:
    a. Eliminating the effect of scattered light through the medium while electrically processing said detected apparent luminances.

6. A method as claimed in claim 5 where said medium is a smoke plume and further comprising the step of:
    a. Providing for said indication a direct reading in percent opacity of said smoke plume.

7. A system for measuring the opacity or transmittance of a medium comprising,
    a light transmitter, including,
        a. a light source for emitting light,
        b. a target for providing an optical contrast to said light source,
        c. means for causing said light to be emitted from said light transmitter as pulses of light;
    a receiver, including,
        a. a photosensitive detector spaced from said light source and target and positioned to have its field of view filled thereby, for providing an output in proportion to the intensity of light received through said medium,
        b. a processing circuit connected to said detector for providing an electrical signal proportional to the detector output, said processing circuit including,
            i. means for calibrating said receiver with reference to said light source and contrasting target clear of the effect of said medium,
        c. and means connected to said processing circuit for providing a sensible indication of opacity or transmittance of the medium.

8. A system as claimed in claim 7 wherein,
    a. said causing means comprises means for intermittently energizing said light source to cause said light source to emit pulses of light.

9. A system as claimed in claim 8 wherein,
    a. said processing circuit includes means for substantially eliminating the effect of steady-state components received at said detector, and
    b. said light source and said detector define the sole light path between said transmitter and receiver through said medium for receipt of light by said detector.

10. A system as claimed in claim 9 wherein,
    a. said target is black, and
    b. said light source is approximately centered in said black target with reference to the field of view of said detector.

11. A system as claimed in claim 10, wherein
    a. said medium is a smoke plume, and
    b. said providing means is a meter for providing a direct reading in percent opacity of said smoke plume.

* * * * *